Feb. 14, 1928.
J. W. MARTIN, JR
1,659,434
APPARATUS FOR SOLIDIFYING CARBON DIOXIDE
Filed April 20, 1926  2 Sheets-Sheet 1
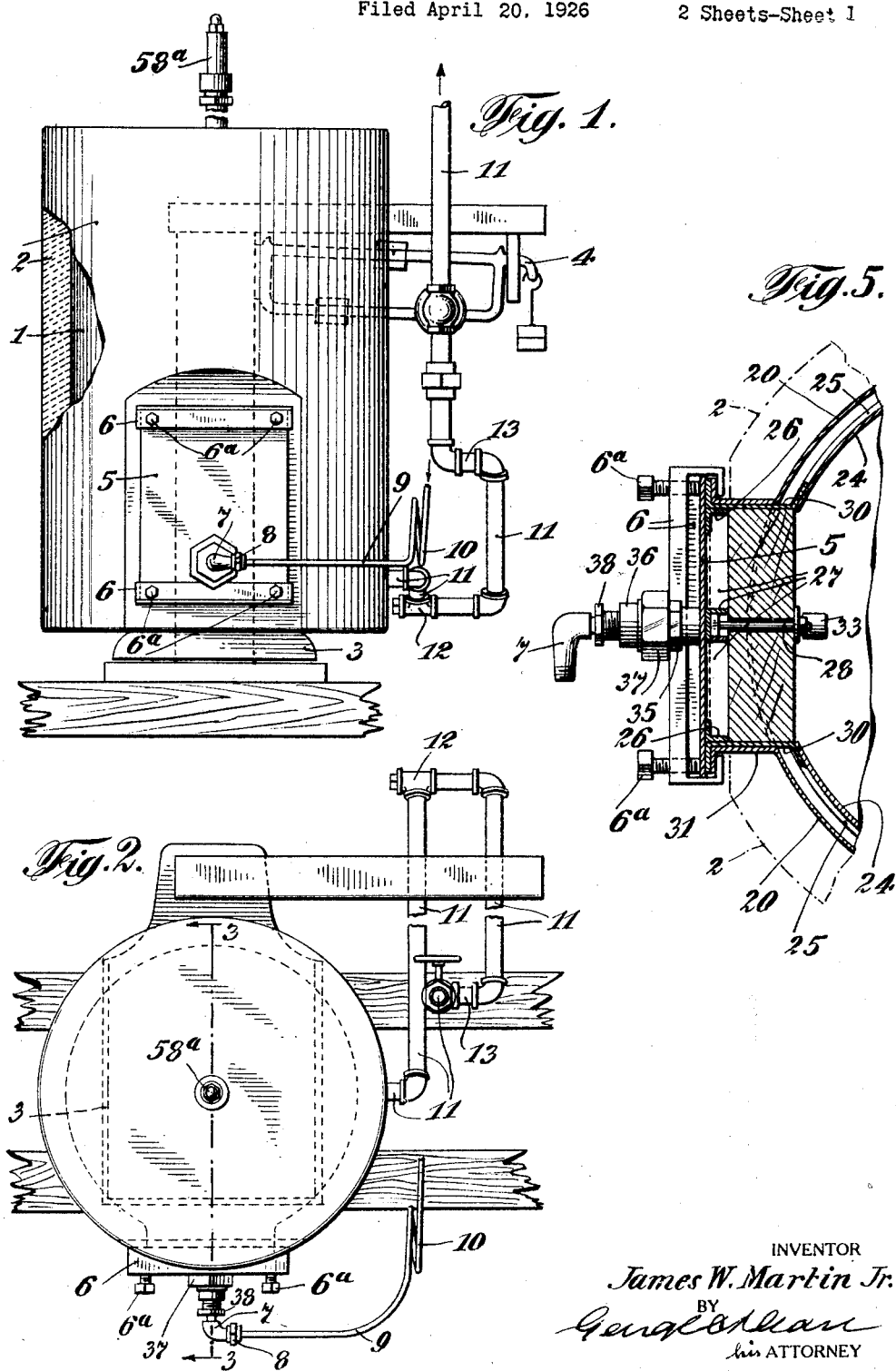
INVENTOR
James W. Martin Jr.
BY
George E. Dean
his ATTORNEY

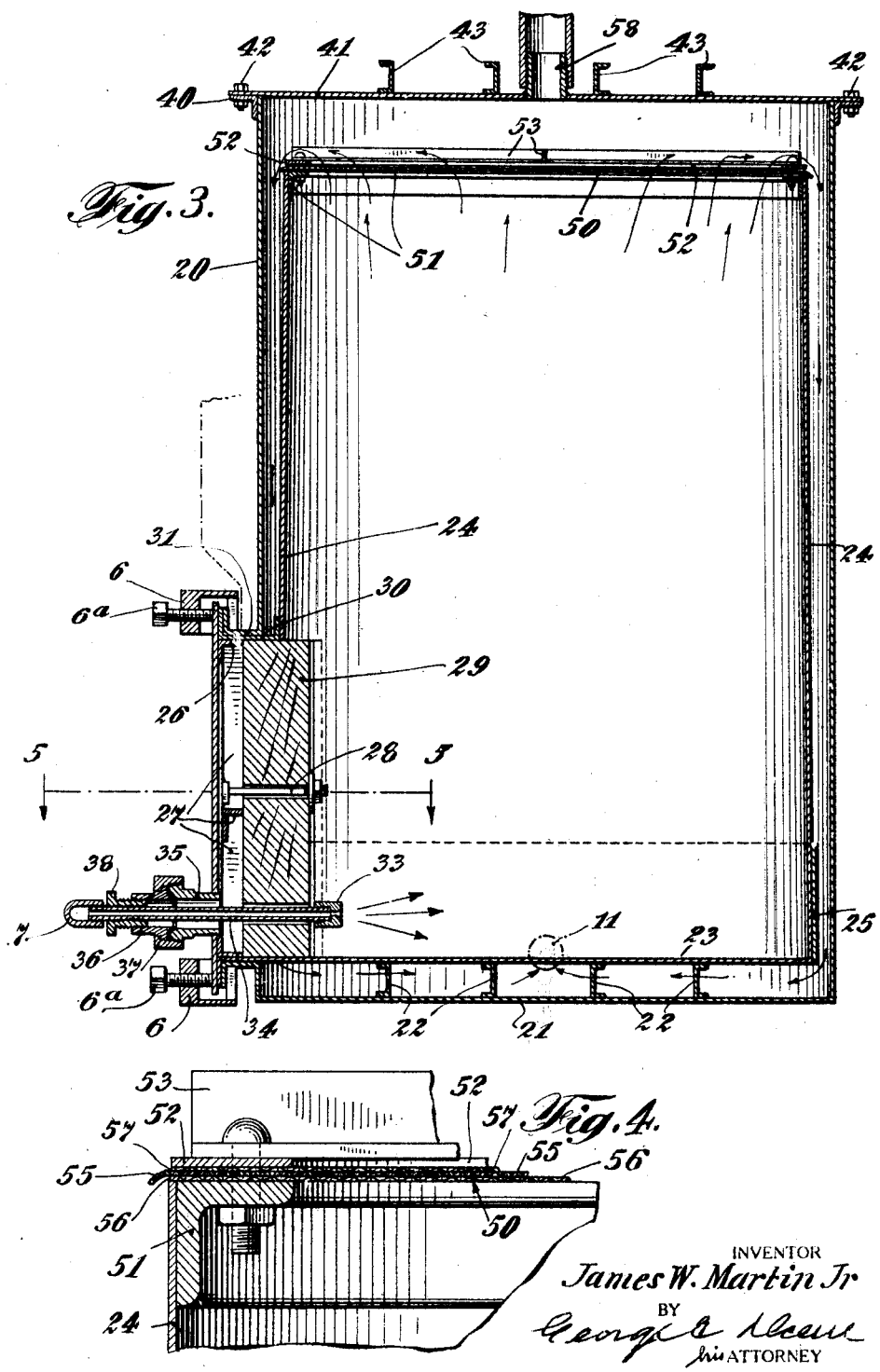

Patented Feb. 14, 1928.

1,659,434

UNITED STATES PATENT OFFICE.

JAMES W. MARTIN, JR., OF TUCKAHOE, NEW YORK, ASSIGNOR TO DRYICE CORPORATION OF AMERICA, OF NEW YORK, N. Y., A CORPORATION OF DELAWARE.

APPARATUS FOR SOLIDIFYING CARBON DIOXIDE.

Application filed April 20, 1926. Serial No. 103,218.

My present invention concerns large quantity production of solidified carbon dioxide in the form of dense structurally coherent blocks such as are now going into extensive use for refrigeration and similar purposes, and more particularly to the production of so-called carbon dioxide snow suitable for being compressed to form such blocks. The snow is produced by special application or development of the well known expansion principle. That is to say, liquid carbon dioxide, under compression of 1000 pounds to 1200 pounds per square inch and at any desired temperature below the critical temperature of 88° F., is abruptly released from such pressure, permitting free expansion of the gas with the well known result of phenomenal refrigerating effect that results in freezing to snow-like form part of the carbon dioxide gas, usually somewhat less than half, while the rest passes off in gas form, at the freezing temperature, which is approximately 114° F. below zero. The escaping gas is ordinarily recompressed to liquid with additional supplies of liquid drawn from the primary source for further conduct of the process.

The specific objects of the invention are to facilitate economical production of large quantities of the snow, the apparatus herein illustrated having a maximum capacity of, say, 400 pounds of snow production per hour. Important features of the invention include the following:

The carbon dioxide is released through a relatively small jet orifice, which may be say $\frac{3}{32}$ of an inch in diameter, and is permitted to expand in a relatively large tank which, in the present case, is say 3½ to 4 feet high by 2½ to 3 feet in diameter, with a view to affording ample space for quiet expansion rather than interfering with the jet and causing it to do work either by impingement of the gas stream lines upon each other or upon a movable or stationary surface, as has heretofore been considered desirable for efficient development of refrigerating effect.

Another feature is having the jet discharged near the bottom of the tank or container, so that the escaping gas, with the entrained snow, will have a long path of travel directly upward against gravity, in what amounts to a settling chamber. Another feature includes providing a very effective screen of very large area, so that it may be a relatively fine mesh canvas and yet not be clogged by the snow sufficiently to create too great back pressure such as might be disruptive of the screen. In addition to being of large area, the screen is substantially horizontal so that snow collecting on the screen must hang vertically downward as from a ceiling, thus minimizing the amount collected and facilitating removal thereof. In this connection, the structure of the screen itself is of considerable importance, in that it contemplates the use of canvas, as the screen, between two layers of wire cloth or netting which may be relatively heavy galvanized wire of quarter inch mesh. These three plies being tightly clamped at the edges, the upper wire netting affords a backing which will support the canvas against rupture by blow-out even if the pressures should become very great, because of undue clogging of the canvas. Even this great reenforcement is preferably supplemented by employment of channel irons across the upper surface of the upper wire screen. The lower wire screen has an important function as a means for clearing the canvas of snow collected on the lower surface thereof. A blow on the screen will cause well distributed impact over the under surface of the canvas, breaking up the snow thereon; and I have discovered that it has a further novel electrical function: The operation of the jet is to produce static electricity with which the particles of snow are highly charged, causing agglomeration of the particles as a relatively dense, coherent sheet. The metal wires of the screen collect and discharge this through the metal walls of the apparatus, thereby decreasing the density and quantity of the deposit on the screen.

The above described screen-topped snow chamber is surrounded by an outer shell or casing so that the escaping, intensely cold gas overflowing through the screen spills down through the interspace, thus maintaining the entire exterior of the tank at a very low temperature, as near as may be to the critical snow forming temperature. This gas is drawn off from the bottom of the outer tank or shell and returned for reliquefying. Incidentally, it may be used countercurrent on the incoming supply of liquid to pre-cool the same to a very low temperature before it is discharged through the jet.

As a result, these various improvements, particularly the feature of snow formation near the bottom of the tank and the slow upward progress of the mixture, toward the screen, through the previously collected quantities of the snow, are very effective in facilitating recovery of a relatively large percentage of the liquid, in snow form, the yield under good conditions being 40% or even more.

Other novel features of great practical importance are first, locating the safety valve at the end of a conduit a considerable distance above the snow-forming tank, so as to minimize the danger of freezing up. This safety provision would be practically ineffective, however, except for an entirely novel feature of locating the entire apparatus on the platform of scales so that the filling of the snow chamber with snow may be accurately gauged by the increasing weight shown on the scales. In the apparatus shown, 400 pounds of snow is about as much as is safe to accumulate in one run, since materially greater amounts will result in clogging the whole apparatus.

As the tank fills up, the space for free escape of the gas becomes smaller and as the snow builds up against the under side of the screen, the internal pressure quickly rises, with the result of forcing excessive quantities of snow through the screen and usually rupturing it. Even a small hole through the screen will permit passage of relatively large quantities of snow, which finds its way to the bottom of the interspace between the snow chamber and the casing and, because of its peculiar packing qualities, the snow quickly clogs the gas outlet, practically sealing it. The further increase of pressure naturally results in blowing of the safety valve, but the safety valve outlet being no longer screened from the snow, is itself clogged almost instantly. Then, there being no escape from the gas, the pressure can increase up to that of the source, say, 1000 pounds per square inch, and the tank then blows up, usually through the upper end, it being impractical to make this end of the chamber strong enough to withstand even a small fraction of 1000 pounds per square inch over a flat surface three feet in diameter.

The above and other features of my invention will be more evident from the following description in connection with the accompanying drawings, in which—

Fig. 1 is a front elevation of the whole apparatus;

Fig. 2 is a top plan view;

Fig. 3 is a section on the line 3—3, Fig. 2;

Fig. 4 is a detail view showing the screen and its securing means in section on the same plane but larger scale than Fig. 3; and Fig. 5 is a section on the line 5—5, Fig. 3.

In these drawings, the entire snow making apparatus, including casing 1 and insulating lagging 2, is shown as mounted on the platform, 3, of scales, the scale beam of which is indicated at 4. The interior is accessible through a removable door 5, secured by top and bottom clamp 6, 6 and preferably the jet is located in the door, its outer end, 7, being connected by a union 8 to a pipe 9. This pipe is preferably of small copper tubing, say, ¼ inch, which is flexible, even though the walls be very thick, and has its flexibility further increased as by coiling the pipe at 10. The outlet for the cold gas part of the product of the snow making is through pipe 11, which is rendered flexible by insertion of swivel joints as at 12, 13.

The weight of the tank being known, the scale beam is adjusted for the weight of the tank plus the weight of carbon dioxide snow that it is desired to produce during each run, as for instance, 300 to 400 pounds.

The entire interior construction is of sheet metal and channel iron, preferably heavily galvanized iron and, as far as possible, the different parts are secured together by riveting or by electric welding.

Referring to Figs. 3 and 4, it will be seen that the metal parts within the heat insulating lagging 2 include the cylindrical outer casing 20, in which the bottom 21 is preferably secured by welding. The bottom is stiffened by channel irons 22, 22, etc., which are preferably spot welded to the bottom 21, and which support the bottom, 23, of the inner tank or snow chamber. The sides, 24, of this snow chamber are slightly frusto-conical, being say ½ inch smaller diameter at the top than at the bottom. Around the bottom I preferably secure a relatively heavy band, 25, of galvanized iron, which projects slightly below the sides to form a chamfer in which the bottom 23 is welded. This re-enforcement of the side walls toward the bottom and the greater thickness of the bottom itself are desirable to withstand wear and prevent denting likely to be caused by use of shovels and other implements in the frequent removal of the snow. The door, 5, is in the nature of a cast iron hatch, one surface of which has welded thereto a channel iron frame, 26, and also diagonal bracing channel irons, 27, to the inner surface of which is secured as by bolt 28, a block of insulating material, 29, preferably balsa wood. This door is therefore in the nature of a massive plug closure or hatch, and the door-frame which it fits is afforded by an inner hatchway member, 30, welded to the inner wall, 24, and a similar outer member, 31, welded to the outer cylinder 20, both members being welded to each other and out turned to form clamping flanges, as shown, which are engaged by the above referred to clamps 6, 6, provided with the clamping screws 6ª, 6ª. Projecting through this door is the jet fitting terminating in the nozzle, 33. This nozzle is carried by pipe 34, extending through to the supply 7, above referred to. Preferably, this pipe passes through relatively large openings in the door and in the balsa wood box, the door having welded thereon a screw-threaded nipple, 35, having a cone joint fit with a cone coupling 36, secured by clamping collar 37 in the outer end of which is screw-threaded the nipple 38 which has secured therein the jet pipe 34.

The casing tank, 20, is provided at the top with a channel iron flange, 40, which is welded thereto, and the top plate, 41, is secured to this flange as by bolts 42. As the surface of plate 41 is large and it may be subject to great pressure, and also as means for anchoring the insulating lagging, I provide channel irons, 43, which are secured to said plate, preferably by welding.

The upper end of the inner tank is closed in only by the screen, 50, clamped against the upper surface of flange 51 by clamping ring, 52, backed by diametrical channel irons, 53. As shown more clearly in Fig. 4, the screen consists essentially of a canvas layer, 55, clamped between a lower wire net, 56, and an upper wire net 57, each of which may be made of four-mesh galvanized iron wire.

The nipple, 58, leading to the safety valve 58ª and the cold gas outlet 11, are secured by welding.

The operation of the device will be evident from the foregoing. A supply of liquid carbon dioxide at pressures of 1000 to 1200 pounds, as well as pre-coolers, control valves and any other desired accessories, are assumed for the supply pipe 10, and corelative controlling valves, heat exchanges, recompressors, etc., are assumed for the waste exit gas pipe 11.

The door 5 being clamped in place, the scales set for the desired weight of carbon dioxide snow plus the weight of the container and the supply and exhaust valves being turned on, the liquid carbon dioxide will reach the outlet nozzle 33, in liquid form, where the expansion will be from 1000 or 1200 pounds afforded by the source, down to say, 5 pounds more or less, representing the back pressure necessary to force the gas through the return pipe. This minimum of expansion pressure will fluctuate, according to the resistance imposed by the increasing amounts of superposed snow and particularly by the thickness and density of the layer of snow that collects on the lower surface of the screen and, as before very fully explained, the internal pressure will rise in response to clogging of the outlet up to the full limit of the 1000 pounds or more pressure of the source. Hence, so long as only impalpably small quantities of the snow get through the screen, or are crystallized out in the upper space after the gas gets through the screen, such snow will be sufficiently taken care of by re-vaporization due to the heat which will leak through to the insulation, 2, and the safety valve will function for satisfactory governing but, if the snow chamber overflows and ruptures the screen, the large amounts of snow released will clog the outlet to the safety valve, as well as the outlet 11. Experience shows that the piling up of pressure that then occurs, will blow the top off of the tank before it will blow the passages free from the snow. Hence, the great advantage of having the entire apparatus on scales, whereby a run can be continued until the tank has been filled with snow to the maximum safe limit, with a certainty that filling beyond this limit will be indicated, regardless of the internal pressure. Obviously, tilting of the scale beam may be used to control any desirable, audible signal or even automatic means for shutting off the supply and outlet valves.

When the tank is full and the valves are closed, the screws 6ª are loosened, clamps 6 removed and the door drawn out horizontally. The snow may then be shoveled or otherwise be removed in the receptacles or conveyors.

Removal of the snow that sticks to the walls is facilitated by their frusto-conical inclination described above. Very slight movement or melting of the snow frees it from the walls and gives it clearance for downward fall under the influence of gravity.

A few blows on the under wire mesh 50 of the screen will serve to substantially clear this surface of snow.

Thereupon the apparatus may be again closed, started and the operation repeated, an output of several tons per 24-hour day being entirely practical.

As concerns efficiency of the device in snow making, it will be noted that the horizontal cross-section of the snow chamber has an area of approximately 100,000 times the area of the jet and, 35% to 40% of the gas in the jet remaining behind in the form of snow, the velocity of the jet through the screen, theoretically at least, could be about 1/150,000 of its velocity through the jet orifice and, in actual practice, theory may be more or less approximated in some degree. In any event, however, it is certain that the entire upper end of the tank being screened, the flow of gas therethrough is always extremely gentle and that by reason of its weight it flows downward along the sides of the tank in an unbroken cylindrical sheet, which is approximately at snow forming temperature. Thus, the interior of the snow chamber being at the freezing temperature and the upflow of gas therein extremely slow, conditions are favorable for crystallizing out a maximum amount of the snow before the gas passes the screen. Furthermore, after the tank is partly filled with snow, the upflow of the gas, against gravity, and in contact with pre-formed crystals of snow, promotes formation of the maximum amount of crystals of maximum size.

These conditions of functioning, particularly the downflow of the cold gas in contact with the diverging outer walls of the snow chamber, make it possible to use good heavy galvanized iron and, notwithstanding the conductivity of the latter, most efficient operation can be maintained with the employment of exterior cork composition insulation not exceeding three or four inches in thickness.

I claim:

1. An expansion nozzle and means for supplying liquid carbon dioxide thereto, a relatively large snow chamber in which said nozzle discharges, means for screening out the solidified carbon dioxide and a return conduit for the gas from which it is separated, in combination with safety appliances including a safety relief valve for the upper part of the snow chamber, together with means including a gravity movable support on which said snow chamber rests throughout the snow forming operation, means permitting movement of said support and means actuated thereby whereby the weight of a predetermined amount of snow in said container actuates an external indicating device.

2. Apparatus for separating solids from gaseous suspension, including a closed, heat-insulated container arranged as a settling chamber, a supply conduit and nozzle for the discharge of gas in said chamber, a screened outlet and a discharge pipe for the separated gas escaping through the screen, in combination with support means which bears the entire weight of said settling chamber during the snow making operation, said support means being unresponsive to the weight of the apparatus but adapted to yield responsively to said weight plus that of the separated material when the amount of the latter collected in said chamber exceeds a predetermined weight.

3. Apparatus for separating solids from gaseous suspension, including a closed, heat-insulated container arranged as a settling chamber, a supply conduit and nozzle for the discharge of gas in said chamber, a screened outlet and a discharge pipe for the separated gas escaping through the screen, in combination with support means which bears the entire weight of said settling chamber during the snow making operation, said support means being unresponsive to the weight of the apparatus but adapted to yield responsively to said weight plus that of the separated material when the amount of the latter collected in said chamber exceeds a predetermined weight, the supply conduit and the discharge pipe having flexible connections with the chamber so as to afford practically negligible interference with the operation of said weight responsive support means.

4. An expansion nozzle, means for supplying liquid carbon dioxide to the nozzle, a relatively large snow chamber in which said nozzle discharges, transversely near the bottom thereof, said chamber being an upright tank of greater height than width, having upwardly converging side walls, and the top thereof being closed by a large area fibrous screen.

5. An expansion nozzle, means for supplying liquid carbon dioxide to the nozzle, a relatively large snow chamber in which said nozzle discharges, transversely near the bottom thereof, said chamber being an upright tank of greater height than width and the top thereof being closed by a large area fibrous screen, 6. An expansion nozzle, means for supplying liquid carbon dioxide to the nozzle, a relatively large snow chamber in which said nozzle discharges, transversely near the bottom thereof, said chamber being an upright tank of greater height than width and the top thereof being closed by a large area fibrous screen, said screen including a sheet of the fibrous material strengthened by wire netting.

7. An expansion nozzle, means for supplying liquid carbon dioxide to the nozzle, a relatively large snow chamber in which said nozzle discharges, transversely near the bottom thereof, said chamber being an upright tank of greater height than width and the top thereof being closed by a large area fibrous screen, said screen including a sheet of the fibrous material strengthened by wire netting backed by rigid cross-bars.

8. An expansion nozzle, means for supplying liquid carbon dioxide to the nozzle, a relatively large snow chamber in which said nozzle discharges, transversely near the bottom thereof, said chamber being an upright tank of greater height than width and the top thereof being closed by a large area fibrous screen, said screen including a sheet of the fibrous material strengthened by wire netting backed by rigid cross-bars, and below said fibrous sheet, another sheet of wire netting for the purpose described.

9. An expansion nozzle, means for supplying liquid carbon dioxide to the nozzle, a relatively large snow chamber in which said nozzle discharges, transversely near the bottom thereof, said chamber being an upright tank of greater height than width and the top thereof being closed by a large area fibrous screen backed by rigid cross-bars.

10. An expansion nozzle, means for supplying liquid carbon dioxide to the nozzle, a relatively large snow chamber in which said nozzle discharges, transversely near the bottom thereof, said chamber being an upright tank of greater height than width and the top thereof being closed by a large area fibrous screen, and below said fibrous sheet, a sheet of wire netting for the purpose described.

11. Carbon dioxide snow-forming apparatus, including a snow-forming jet and a separating chamber into which said jet discharges, said separating chamber consisting of an upright shell having an opening at the top through which the waste carbon dioxide gas escapes and a second enclosing shell or casing of somewhat similar shape, exteriorly protected by heat insulating material and in which said separating chamber is supported from below by means affording an interspace entirely above, below and surrounding the separating chamber whereby the escaping gas flows downward into said interspace; said separating chamber having a low-level, normally-closed outlet through which the snow may be removed.

12. Carbon dioxide snow-forming apparatus, including a snow-forming jet and a separating chamber into which said jet discharges, said separating chamber consisting of an upright shell having an opening at the top, closed by a fibrous screen both of large area, through which the waste carbon dioxide gas escapes freely, and a second enclosing shell or casing of somewhat similar shape, exteriorly protected by heat insulating material and in which said separating chamber is supported from below by means affording an interspace entirely above, below and surrounding the separating chamber whereby the escaping gas flows downward into said interspace, and means for permitting escape of the waste gases having its intake near the bottom of said interspace.

13. Carbon dioxide snow-forming apparatus, including a snow-forming jet and a snow-separating chamber into which said jet discharges, said snow chamber consisting of an upright tank having an open top provided with a fibrous screen through which the waste carbon dioxide gas escapes, and an exteriorly insulated enclosing shell or casing of somewhat similar shape in which said snow chamber is supported from below by means affording a closed interspace above, below and surrounding the snow chamber whereby the escaping gas flows downward into said interspace.

14. Carbon dioxide snow-forming apparatus, including a snow-forming jet and a snow-separating chamber into which said jet discharges, said snow chamber consisting of an upright tank having an open top provided with a fibrous screen through which the waste carbon dioxide gas escapes, and an exteriorly insulated enclosing shell or casing of somewhat similar shape in which said snow chamber is supported from below by means affording a closed interspace above, below and surrounding the snow chamber whereby the escaping gas flows downward into said interspace, and means for permitting escape of the waste gases collecting near the bottom of said interspace, said snow chamber and casing being of galvanized iron with welded joints and fittings.

15. Carbon dioxide snow-forming apparatus, including a snow-forming jet and a snow-separating chamber into which said jet discharges, said snow chamber consisting of an upright tank having an open top provided with a fibrous screen through which the waste carbon dioxide gas escapes, and an exteriorly insulated enclosing shell or casing of somewhat similar shape in which said snow chamber is supported from below by means affording a closed interspace above, below and surrounding the snow chamber whereby the escaping gas flows downward into said interspace, and means for permitting escape of the waste gases collecting near the bottom of said interspace, said snow chamber and casing being of galvanized iron with welded joints and fittings and the support means for the inner tank including channel bars welded in place.

16. Carbon dioxide snow-forming apparatus, including a snow-forming jet and a snow-separating chamber into which said jet discharges, said snow chamber consisting of an upright tank having walls slightly inclined inward toward an open top provided with a snow screen through which the waste carbon dioxide gas escapes and an exteriorly lagged enclosing shell or casing of somewhat larger size in which said snow chamber is supported from below by structural members affording an interspace unobstructed above, below and surrounding the snow chamber whereby the escaping gas flows downward into said interspace, said snow chamber and enclosing casing being of galvanized iron and formed with a passageway and removable closure opening laterally from near the bottom of the snow chamber.

17. Carbon dioxide snow-forming apparatus, including a snow-forming jet and a snow-separating chamber into which said jet discharges, said snow chamber consisting of an upright tank having walls slightly inclined inward toward an open top provided with a snow screen through which the waste carbon dioxide gas escapes, and an exteriorly lagged enclosing shell or casing of somewhat larger size in which said snow chamber is supported from below by structural members affording an interspace unobstructed above, below and surrounding the snow chamber whereby the escaping gas flows downward into said interspace, said snow chamber and enclosing casing being of galvanized iron and formed with a passageway and removable closure opening laterally from near the bottom of the snow chamber, and a nozzle for the snow-forming jet being carried by and projecting through said closure.

18. Carbon dioxide solidifying apparatus, including a means for supplying liquid carbon dioxide and a nozzle for discharging it into a relatively large settling chamber having an approximately horizontal screen of large area closing an outlet for the top thereof, in combination with an outer exteriorly insulated enclosing shell spaced apart from the walls of said settling chamber to permit free downflow of the cold gas escaping through the screen and having an exterior outlet for said gas from regions near the bottom thereof.

19. Carbon dioxide solidifying apparatus, including a means for supplying liquid carbon dioxide and a nozzle for discharging it into a relatively large settling chamber having an approximately horizontal screen of large area closing an outlet for the top thereof, in combination with an outer exteriorly insulated enclosing shell spaced apart from the walls of said settling chamber to permit free downflow of the cold gas escaping through the screen and having an exterior outlet for said gas from regions near the bottom thereof and a removable sealing closure opening approximately at the level of the bottom of said settling chamber.

20. Carbon dioxide solidifying apparatus, including a means for supplying liquid carbon dioxide and a nozzle for discharging it into a relatively large settling chamber having a screen of large area closing an outlet for the top thereof, in combination with an outer exteriorly insulated enclosing shell spaced apart from the walls of said settling chamber to permit free downflow of the cold gas escaping through the screen and having an exterior outlet for said gas from regions near but substantially above the bottom thereof.

21. Carbon dioxide solidifying apparatus, including a means for supplying liquid carbon dioxide and a nozzle for discharging it into a relatively large settling chamber having a screen of large area closing an outlet for the top thereof, in combination with an outer exteriorly insulated enclosing shell spaced apart from the walls of said settling chamber to permit free downflow of the cold gas escaping through the screen and having an exterior outlet for said gas from regions near but substantially above the bottom thereof, and a removable sealing closure opening approximately at the level of the bottom of said settling chamber.

22. Carbon dioxide solidifying apparatus, including a means for supplying liquid carbon dioxide and a nozzle for discharging it into a relatively large settling chamber having an approximately horizontal screen of large area closing an outlet for the top thereof, in combination with an outer exteriorly insulated enclosing shell spaced apart from the walls of said settling chamber to permit free downflow of the cold gas escaping through the screen and having an exterior outlet for said gas from regions near but substantially above the bottom thereof.

23. Carbon dioxide solidifying apparatus, including a means for supplying liquid carbon dioxide and a nozzle for discharging it into a relatively large settling chamber having an approximately horizontal screen of large area closing an outlet for the top thereof, in combination with an outer exteriorly insulated enclosing shell spaced apart from the walls of said settling chamber to permit free downflow of the cold gas escaping through the screen and having an exterior outlet for said gas from regions near but substantially above the bottom thereof, and a removable sealing closure opening approximately at the level of the bottom of said settling chamber.

24. An expansion nozzle and means for supplying liquid carbon dioxide thereto, a snow chamber in which said nozzle discharges and a large area screen for screening out the solidified carbon dioxide and permitting escape of the gas from which it is separated and means for protecting the screen from atmosphere, said screen including a sheet of fibrous material strengthened by wire netting.

25. An expansion nozzle and means for supplying liquid carbon dioxide thereto, a snow chamber in which said nozzle discharges and a large area screen for screening out the solidified carbon dioxide and permitting escape of the gas from which it is separated and means for protecting the screen from atmosphere, said screen including a sheet of fibrous material strengthened by wire netting which is in turn backed by rigid bars.

26. An expansion nozzle and means for supplying liquid carbon dioxide thereto, a snow chamber in which said nozzle discharges and a large area screen for screening out the solidified carbon dioxide and permitting escape of the gas from which it is separated and means for protecting the screen from atmosphere, said screen including a sheet of fibrous material clamped between two sheets of wire netting.

27. An expansion nozzle and means for supplying liquid carbon dioxide thereto, a snow chamber in which said nozzle discharges and a large area screen for screening out the solidified carbon dioxide and permitting escape of the gas from which it is separated and means for protecting the screen from atmosphere, said screen including a sheet of canvas clamped between two sheets of wire netting.

Signed at New York city in the county of New York and State of New York this 16th day of April, A. D. 1926.

JAMES W. MARTIN, Jr.